US012207074B2

(12) United States Patent
Taherian et al.

(10) Patent No.: US 12,207,074 B2
(45) Date of Patent: Jan. 21, 2025

(54) METHOD AND SYSTEM FOR DETECTING SOUND EVENT LIVENESS USING A MICROPHONE ARRAY

(71) Applicant: Apple Inc., Cupertino, CA (US)

(72) Inventors: Hassan Taherian, Columbus, OH (US); Jonathan Huang, Pleasanton, CA (US); Carlos M. Avendano, Campbell, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/532,988

(22) Filed: Dec. 7, 2023

(65) Prior Publication Data

US 2024/0107254 A1 Mar. 28, 2024

Related U.S. Application Data

(63) Continuation of application No. 18/061,753, filed on Dec. 5, 2022, now Pat. No. 11,863,961, which is a continuation of application No. 17/326,208, filed on May 20, 2021, now Pat. No. 11,533,577.

(51) Int. Cl.
*H04S 7/00* (2006.01)
*H04R 3/00* (2006.01)

(52) U.S. Cl.
CPC ............. *H04S 7/302* (2013.01); *H04R 3/005* (2013.01); *H04S 2400/11* (2013.01)

(58) Field of Classification Search
CPC ...... H04S 7/302; H04S 2400/11; H04R 3/005
USPC .......................................................... 381/26
See application file for complete search history.

(56) References Cited

U.S. PATENT DOCUMENTS

| | | | | |
|---|---|---|---|---|
| 9,697,248 | B1 | 7/2017 | Ahire | |
| 11,533,577 | B2 * | 12/2022 | Taherian | H04R 3/005 |
| 11,863,961 | B2 * | 1/2024 | Taherian | H04S 7/302 |
| 2018/0122398 | A1 | 5/2018 | Sporer et al. | |
| 2019/0025400 | A1 * | 1/2019 | Venalainen | G06N 20/00 |
| 2019/0132694 | A1 | 5/2019 | Hanes et al. | |
| 2019/0371324 | A1 | 12/2019 | Powell et al. | |
| 2020/0090644 | A1 | 3/2020 | Klingler et al. | |
| 2021/0020018 | A1 | 1/2021 | Kim et al. | |

FOREIGN PATENT DOCUMENTS

| | | |
|---|---|---|
| IN | 20150144713 13 | 4/2015 |
| WO | 2018069774 A1 | 4/2018 |

OTHER PUBLICATIONS

Ntalampiras et al., "On Acoustic Surveillance of Hazardous Situations", 2009 IEEE International Conference on Acoustics, Speech and Signal Processing, Apr. 19-24, 2009. pp. 165-168.

(Continued)

*Primary Examiner* — Paul Kim
(74) *Attorney, Agent, or Firm* — Aikin & Gallant, LLP

(57) ABSTRACT

A method performed by an electronic device in a room. The method performs an enrollment process in which a spatial profile of a location of an artificial sound source is created and performs an identification process that determines whether a sound event within the room is produced by the artificial sound source by 1) capturing the sound event using a microphone array and 2) determining a likelihood that the sound event occurred at the location of the artificial sound source.

20 Claims, 5 Drawing Sheets

(56) References Cited

OTHER PUBLICATIONS

Vinyals et al., “Matching Networks for One Shot Learning”, arXiv: 1606.04080, Dec. 29, 2017, pp. 1-12.
Koch et al., “Siamese Neural Networks for One-shot Image Recognition”, Proceedings of the 32nd International Conference on Machine Learning, Lille, France, 2015. JMLR: W&CP vol. 37, 8 pages.
Campbell et al., “Support Vector Machines using GMM Supervectors for Speaker Verification”, IEEE Signal Processing Letters, vol. 13, Issue: 5, May 2006, pp. 1-8.
Final Office Action of the U.S. Patent Office dated Jan. 13, 2022, for U.S. Appl. No. 16/564,775.
Non-Final Office Action of the U.S. Patent Office dated Apr. 6, 2022 for U.S. Appl. No. 16/564,775.
Non-Final Office Action of the U.S. Patent Office dated Aug. 13, 2021 for U.S. Appl. No. 16/564,775.
Gerhard, David, “Audio Signal Classification: History and Current Techniques”, Technical Report TR-CS Jul. 2003, Nov. 2003, 38 pages.
Green, Marc C., et al., “Acoustic Scene Classification Using Spatial Features”, Detection and Classification of Acoustic Scenes and Events 2017, Nov. 16, 2017, 4 pages.
“What is the basic difference in perception between acoustic and electronic/synthetic sound?”, Sep. 29, 2015, etrieved from the Internet: <https:/fwww.quora.com/What-is-the-basic-different-in-perception-between-acoustic-and-electronic-synthetic-sound>, 5 pages.
Dapayiannis, Constantinos, et al., “Detecting Media Sound Presence in Acoustic Scenes”, Interspeech 2018, Sep. 2, 2018, pp. 1363-1367.
“How do we identify whether a sound is live or recorded?”, 2016, retrieved from the Internet: <htlps:/fwww.esearchgate.net/post/How_do_we_identify_whether_a_sound_is_live_or_recorded>, 3 pages.
“Can You Tell the Difference Between Natural and Artificial Sounds?”, Oct. 6, 2015, retrieved from the Internet: 9 i::https://www.teacherspayteachers.com/Product/Can-You-Tell-the-Difference-Between-Natural-and Artificial-Sounds-1099461 >, pp. 1-3.

* cited by examiner

METHOD AND SYSTEM FOR DETECTING SOUND EVENT LIVENESS USING A MICROPHONE ARRAY

This application is a continuation of co-pending U.S. patent application Ser. No. 18/061,753, filed Dec. 5, 2022, which is a continuation of U.S. application Ser. No. 17/326,208 filed May 20, 2021, now U.S. Pat. No. 11,533,577, issued Dec. 20, 2022, which is hereby incorporated by this reference in its entirety.

FIELD

An aspect of the disclosure relates to an electronic device that uses a microphone array to detect whether a sound event is a live sound event or an artificial sound event. Other aspects are also described.

BACKGROUND

Sound recognition is a process in which a detected sound may be identified. For example, a device with a microphone may capture a sound that is emitted within an ambient environment as a microphone signal, and process the signal using a sound recognition algorithm. In particular, the algorithm may implement pattern recognition operations upon the signal to identify the sound captured within. Such an algorithm has many real-world applications, such as being used to recognize music, speech, etc.

SUMMARY

An aspect of the disclosure is a method performed by a programmed processor of an electronic device (e.g., an audio output device, such as a smart speaker) that is located within a room. The device performs two processes to detect sound event liveness within the room. For instance, the device performs an enrollment process in which a spatial profile (e.g., a statistical model) of a location (or direction) of an artificial sound source (e.g., an audio playback device, such as a television) is created by 1) determining, using a machine learning (ML) model, that one or more segments of audio captured using a microphone array of the electronic device were produced by the artificial sound source and 2), in response to determining that one or more segments of audio were produced by the artificial sound source, using spatial features (e.g., direction of arrival (DoA) vectors) of the one or more segments of audio to determine the location (or direction) of the artificial sound source within the room. The device may also perform (e.g., subsequent to the enrollment process) an identification process to determine whether a sound event within the room is produced by the artificial sound source (or by a live sound source) by 1) capturing the sound event using the microphone array as several of audio frames and 2) determining, for each of the audio frames, a likelihood that the sound event occurred at the location (and/or direction) of the artificial sound source.

In one aspect, the likelihood is determined by determining, for each audio frame, a score based on a comparison of a DoA vector associated with the audio frame and the spatial profile, an average score of the determined scores, and whether the average score exceeds a threshold value. In one aspect, the device extracts spectral features (e.g., spectral content) and spatial features (e.g., DoA vectors) from several segments of audio captured using the microphone array, where determining, using the ML model that the one or more segments of audio were produced by the artificial sound source, includes applying the spectral content and the DoA vectors of the several segments of audio as input to the ML model to produce output that indicates, for each segment of audio of the several segments of audio, whether the artificial sound source or a live sound source produced the segment of audio.

In some aspects, in response to determining that the sound event within the room is not produced by the artificial sound source, the device outputs a notification indicating that the sound event is a live sound event. In one aspect, the enrollment process is performed periodically and without user intervention (or automatically). In another aspect, the one or more segments of audio are each a duration of time (e.g., several seconds in length) and are captured using the microphone array over a period of time (e.g., an hour, a day, a week, etc.). In one aspect, the device determines that the device has moved to a new location and, in response to determining that the device has moved, performing another enrollment process in which an updated spatial profile for the location of the artificial sound source is created using one or more additional segments of audio captured using the microphone array.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1A:
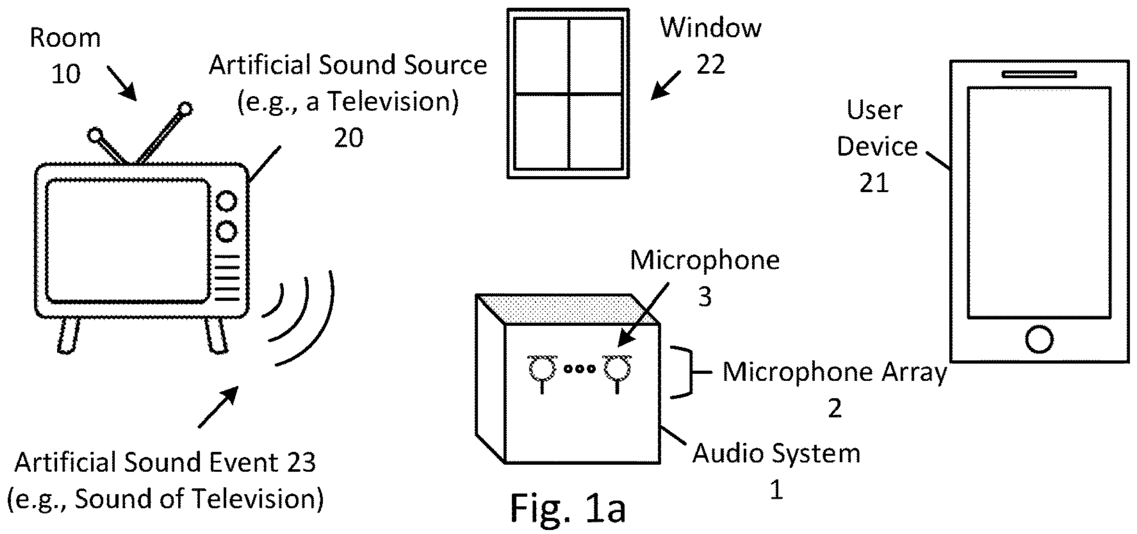
FIGS. 1*a*-1*c* illustrates an audio system performing an enrollment process and an identification process in order to detect a liveness of a sound event, and in response to detecting a live sound event, outputting a notification.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Sound event classification refers to the identification of sounds in the ambient environment (e.g., within a room) based on the sounds' unique characteristics. In some instances, it is necessary to discriminate whether a classified sound is produced by an artificial sound source, such as an audio playback device (e.g., a television), or is produced by a live (or natural) sound source (e.g., a person within the room speaking, etc.). For example, in a security and surveillance system of a property, distinguishing whether sounds such as fire/burglar alarms, a person screaming, etc. are artificial (e.g., being a part of a movie playing on the television) or live may help prevent falsely activating an alarm (or alerting authorities). As another example, classifying between artificial and live sound sources may be important for giving notifications for hearing impaired individuals (e.g., properly notifying a hearing-impaired parent of a baby crying). To classify sound events as artificial or live an audio system may require is significant amount of audio data of the event for processing. In which case, to provide accurate classification the sound event may need to occur for an extended period of time. Short sound events (e.g., glass breaking, a dog bark, a ringing door bell, etc.), however, may be difficult to accurately classify due to their short duration (e.g., one to several seconds). Therefore, there is a need for determining a "liveness" of a detected sound event (e.g., whether a sound event is artificial or live) for discriminating between live and artificial sound events, which may be of any duration (e.g., short, or long) in order to reduce false sound classifications thereby creating a better user experience.

The present disclosure provides a method and a system for detecting sound event liveness (e.g., whether a sound event is occurring at an artificial sound source or a live (or natural) sound source) using a microphone array. Specifically, a system (e.g., an electronic device) that includes a microphone array (of one or more microphones) may perform several processes for determining whether a sound event is artificial or live. For example, the system may perform an "enrollment" process in which a spatial profile of a location (or direction) of an artificial sound source is created using several segments of audio (e.g., produced by the artificial sound source) that are captured by the microphone array. In one aspect, the spatial profile indicates the location (and/or direction) of the artificial sound source with respect to the audio system. The system may then perform an "identification" process to determine whether a sound event (of any duration) within the room is produced by the artificial sound source or produced by a live sound source (e.g., produced by a source other than an audio playback device). The determination may be performed by capturing the sound event and determining a likelihood that the sound event occurred at the location of the artificial sound source. For instance, the system may extract spatial features (e.g., DoA vectors) from the captured sound event and compare the spatial profile to the extracted spatial features. If the system determines that there is a high likelihood based on the comparison, then the system may be reasonably confident that the sound event is an artificial sound event that originated from the artificial sound source. Thus, once a spatial profile for an artificial sound source has been enrolled, spatial features of sound events (regardless of their duration) detected within the room (e.g., dog barks, glass breaking, etc.) can be matched up against the spatial profile to determine whether the sound events are artificial or live. This results in an improved user experience of sound classification systems by lowering false acceptance of sound events caused by artificial sources, such as a television.

Figure 1B:
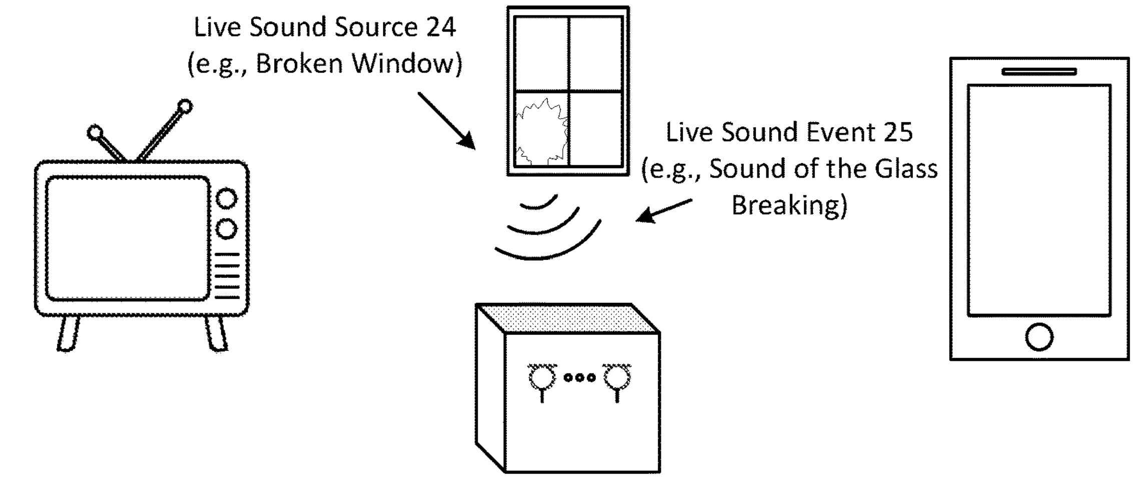
Figure 1C:
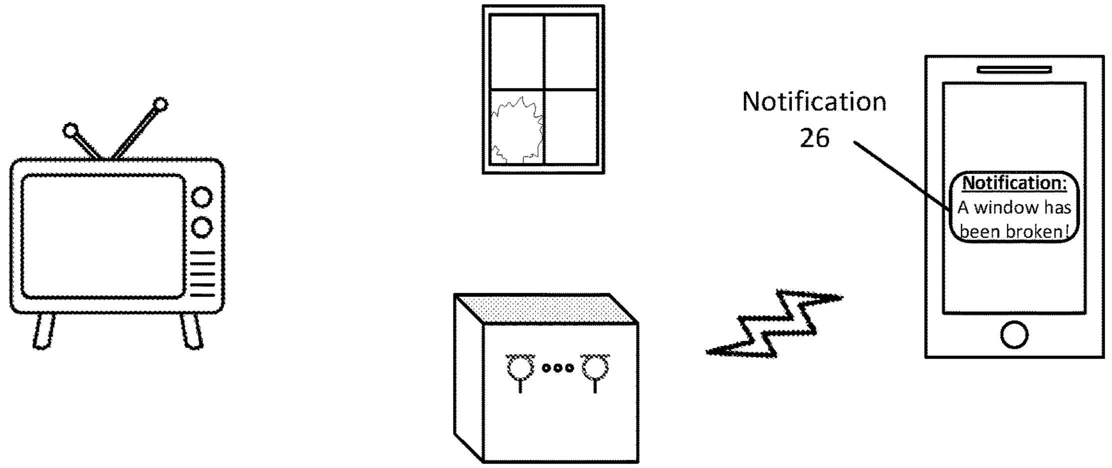

FIGS. 1a-1c illustrates an audio system performing an enrollment process and an identification process in order to detect a liveness of a sound event, and in response to detecting a live sound event, outputting a notification. Specifically, each of these figures illustrates a room 10 that includes an audio system (or electronic device) 1, an artificial sound source 20, a window 22, and a user device 21. In one aspect, although illustrated as being in the same room, at least one of the devices may be in a different room (or location), such as the user device 21.

As illustrated, the artificial sound source 20 is a television. In one aspect, the artificial source may be any sound source that produces sound into the environment using one or more speakers. Specifically, the artificial source may be any audio playback (electronic) device that includes one or more speakers and is designed for audio playback into an environment. For example, the artificial source may be a laptop computer, a desktop computer, a smart speaker, a (e.g., stand-alone) loudspeaker, etc. In one aspect, the artificial source may be a part of an audio system, such as being a part of a home theater system or an infotainment system that is integrated within a vehicle. In one aspect, the artificial source may be a non-portable electronic device (e.g., a device that is designed to normally operate while resting, coupled, mounted, or attached to a surface or object, such as a television that is mounted to a wall). In another aspect, the artificial source may be a portable device, such as a tablet computer, a smartphone, etc. In some aspects, the artificial source may be a wearable audio playback device, such as a headset (e.g., on-ear headphones, etc.), or a wearable device such as a smart watch.

The audio system 1 may be any electronic device that is designed to capture sound from within an ambient environment (e.g., the room 10) and perform audio signal processing operations. For example, the audio system may be any electronic device described herein (e.g., a desktop computer, a smart speaker, etc.). As shown, the audio system includes a microphone array 2 of one or more microphones 3 that are arranged to capture sound of the environment as one or more microphone signals. In one aspect, the microphones may be any type of microphone (e.g., a differential pressure gradient micro-electro-mechanical system (MEMS) microphone) that is arranged to convert acoustical energy caused by sound waves propagating in an acoustic environment into a microphone signal. In one aspect, the audio system may include more or less electronic components (or elements). For instance, the system may include one or more speakers (not shown) that are designed to output sound into the environment. For example, each speaker may be an electrodynamic driver that may be specifically designed for sound output at certain frequency bands, such as a woofer, tweeter, or midrange driver, for example. In one aspect, at least one speaker may be a "full-range" (or "full-band") electrodynamic driver that reproduces as much of an audible frequency range as possible. In another aspect, the audio system may include one or more sensors that are arranged to produce sensor data. For instance, the system may include one or more cameras (not shown), each of which are designed to produce image data that contains scenes of an environment that is within a field of view of the camera. In another aspect, the system may include other sensors (e.g., motion sensors), as described herein. In some aspects, the audio system may include one or more pieces of electronics (e.g., one or more processors, memory, etc.) for performing one or more audio signal processing operations for detecting the liveness of a captured sound event. More about these operations is described herein.

The user device 21 is illustrated as a multimedia device, more specifically, a smartphone. In one aspect, the user device may be any electronic device that may perform audio signal processing operations and/or networking operations. Examples of such a device may include any of the examples provided herein (e.g., a tablet computer, etc.). In another example, the user device may be a head-mounted device, such as smart glasses, or a wearable device, such as a smart watch.

In one aspect, the audio system 1 and the user device 21 may be configured to be communicatively coupled, via a wireless connection to one another. For instance, the audio system may be configured to establish a wireless connection with the user device via any wireless communication protocol (e.g., BLUETOOTH protocol). For instance, the audio system may wirelessly communicate (e.g., using IEEE 802.11x standards or other wireless standards) with the user device or any other device by transmitting and receiving data packets (e.g., Internet Protocol (IP) packets). In one aspect, the devices may communicate with one another over the air (e.g., via a cellular network).

Returning to FIG. 1*a*, this figure shows the audio system 1 performing the enrollment process in which a spatial profile of the artificial sound source 20 is created. Specifically, this figure shows that an artificial sound event 23 (e.g., sound) is being output by the artificial source (e.g., television) 20. In particular, a speaker of the television may be playing back sound of a television program that is being displayed on a screen of the device. In one aspect, the audio system 1 (e.g., contemporaneously with the sound playback by the TV) captures the artificial sound event (e.g., as a segment of audio) using the microphone array 2 as one or more microphone signals. As described herein, the audio system may use (e.g., at least a portion of) the segment of audio to create a spatial profile of a location (and/or direction) of the artificial sound source. For instance, the audio system may determine, using a ML model, that the segment of audio is produced by an artificial sound source, and, in response to determining that the segment of audio was produced by the artificial sound source (e.g., and not a live sound source), using spatial features, such as DoA vectors of the segment to determine the location (and/or direction) of the artificial sound source within the room, with respect to the (e.g., microphone array of the) audio system. In one aspect, the audio system may use multiple (or one or more) segments of audio produced by the artificial sound source for creating (or generating) the spatial profile. More about performing the enrollment process is described in FIGS. 2 and 4.

FIG. 1*b* shows the audio system 1 performing an identification process in which the system determines whether a sound event within the room is produced by the artificial sound source 20 or a live sound source. As illustrated, a pane of the window 22 is broken (e.g., by a baseball being thrown into the window), which creates sound of the glass breaking that originates at the broken window. Specifically, the sound of the glass breaking is considered a "live" sound event 25, which is a sound event that occurs naturally in the environment and originates from a broken window pane acting as a live sound source 24. This is opposed to the artificial sound event 23, which is created by one or more speakers that acts as an artificial sound source 20. In one aspect, other live sound events are possible, such as a person speaking in the room 10, movement of an object (e.g., a chair being moved across a wood floor, etc.).

In one aspect, the audio system 1 may perform the identification process to determine whether the sound event 25 captured using the microphone array 2 (e.g., as a segment of audio) is produced by the artificial sound source 20. In one aspect, the system may capture the sound event as one or more audio frames, where each audio frame contains a portion of digital audio data. The audio system may determine, for each of the audio frames, a likelihood that the sound event occurred at the location (and/or direction) of the artificial sound source. In one aspect, this determination may be based on a comparison of spatial features of the audio frames (e.g., determined DoA vectors) and the spatial profile of the artificial sound source created during the enrollment process. In some aspects, the audio system may determine that the sound event occurred at the artificial sound source when it is determined that at least some of the DoA vectors match the spatial profile (e.g., within a tolerance). More about the identification process is described in FIGS. 3 and 5.

FIG. 1*c* illustrates the audio system 1 outputting (or transmitting) a notification 26 to the user device 21, in response to determining that the sound event 25 detected in FIG. 1*b* is a live sound event. Specifically, the audio system may determine whether the event is a live event based on a comparison of the sound event 25 and the created spatial profile. For example, the audio system may derive a score based on the comparison and determine whether the sound event is artificial when the score is above a threshold value. More about the score is described herein. In response to the audio system determining that the sound event is in fact live (e.g., the score being below the threshold), the audio system transmits the notification 26 to the user device (e.g., via a wireless connection) that informs the user of the live sound event.

In one aspect, the audio system may perform sound recognition operations upon the captured sound event to identify the event. Specifically, the audio system may extra spectral features from the sound event and perform a spectral comparison to predefined spectral features (e.g., stored within the audio system) to identify (or classify) the sound event. Once classified (e.g., matching the spectral features of the event with a predefined spectral feature), the audio system transmits the notification, identifying the event. As shown here, the notification is a pop-up notification that is displayed on a display screen of the user device, alerting the user that a window has been broken. Thus, the operations described in these figures may determine with a high level of accuracy when a detected sound event occurring within a room originates naturally (or at a live sound source), rather than artificially.

Figure 2:
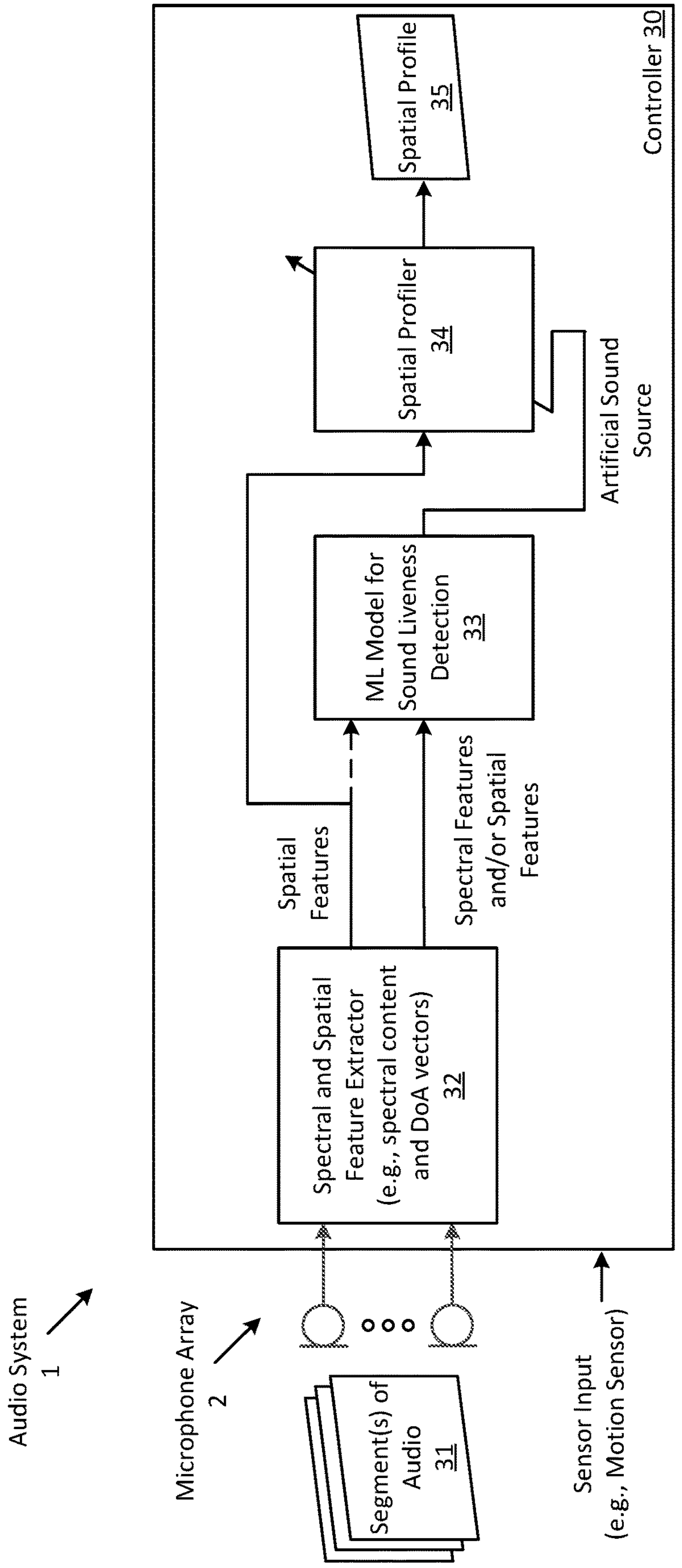
FIG. 2 shows a block diagram of the audio system that is configured to perform the enrollment process for creating a spatial profile of an artificial sound source according to one aspect.

FIG. 2 shows a block diagram of the audio system 1 that is configured to perform the enrollment process for creating a spatial profile of an artificial sound source according to one aspect. As shown, the audio system 1 includes the microphone array 2 and a controller 30. In one aspect, the audio system may include more (or less) elements, such has having one or more speakers, as described herein.

The controller 30 may be a special-purpose processor such as an application-specific integrated circuit (ASIC), a general-purpose microprocessor, a field-programmable gate array (FPGA), a digital signal controller, or a set of hardware logic structures (e.g., filters, arithmetic logic units, and dedicated state machines). The controller is configured to perform audio signal processing operations upon digital audio data to perform the enrollment process to create one or more spatial profiles of artificial sound sources, as described herein. More about the operations performed by the controller is described herein. In one aspect, operations performed by the controller may be implemented in software (e.g., as instructions stored in memory of the audio system (and/or memory of the controller) and executed by the controller and/or may be implemented by hardware logic structures.

As illustrated, the controller 30 may have one or more operational blocks, which may include a spectral and spatial feature extractor 32, a ML model for sound liveness detection (or ML model) 33, and a spatial profiler 34.

In one aspect, the microphone array 2 is arranged to capture one or more segments of audio 31 (e.g., sound within the ambient environment) as one or more microphone signals. For example, a segment of audio 31 may occur in the environment (e.g., room 10) as a sound event, such as (e.g., at least a portion of) sound that is being emitted by a television, such as the artificial sound source 20 in FIG. 1. In one aspect, a segment of audio is associated with one (e.g., continuous) sound event (e.g., a song playing on a radio). In another aspect, a segment of audio may be a portion of a sound event. In one aspect, a segment of audio may be of a particular duration (e.g., at least thirty seconds in length). In another aspect, a segment of audio may be of any duration.

In some aspects, the microphone array may be always active (or on) for capturing sound of the ambient environment. In another aspect, the microphone array may capture sound based on whether certain conditions are met. For instance, the controller 30 may monitor a sound pressure level (SPL) of at least one microphone signal, and once the sound level exceeds a threshold (e.g., indicating there is a sound in the environment), the controller may activate the microphone array to capture the segments of audio.

The spectral and spatial feature extractor 32 receives (or obtains) one or more microphone signals captured by the microphone array 2 that include at least one captured segment of audio 31, and extracts (or determines) spectral and spatial features from the segment. In one aspect, the extracted spectral features may include (at least some) spectral content (e.g., as a spectrogram) of the segment of audio across one or more frequency ranges. For example, the extractor may determine a power spectral density (PSD) of the (or at least some of the) segment of audio.

In one aspect, the extracted spatial features may include spatial information (e.g., location, direction, etc.) of the captured segment of audio with respect to the audio system (or more specifically with respect to the microphone array). In one aspect, a spatial feature may include one or more DoA vectors that are computed for the segment of audio. For example, a segment of audio may be captured as one or more audio frames, each audio frame including a duration (e.g., 10-100 ms) of digital audio. The extractor may determine, for each audio frame, a DoA vector. In one aspect, the extractor may determine the DoA vector based on maximizing a cross-correlation between at least two microphone signals (e.g., using a generalized cross correction phase transform (GCC-PHAT) method). In another aspect, the extractor may determine the DoA using a local space domain distance (LSDD) method. In some aspects, the extractor may use any method to determine DoA vectors of (e.g., each audio frame of) the segment of audio. In another aspect, the extractor may be a feature embedding of a deep neural network (DNN), trained for determining a DoA for an audio frame.

In some aspects, the spatial features may be extracted from other sensor data. Specifically, the feature extractor 32 may be figured to determine a DoA for the captured segment from wireless (e.g., radio frequency (RF)) signals received from the sound source. For example, when the sound source is an electronic device that is communicatively coupled (e.g., via any wireless connection, such as a BLUETOOTH connection, an Ultra-wideband (UWB) connection, etc.) with the audio system (e.g., a smart television), the feature extractor may determine the DoA based on signal strength of the connection (e.g., using a received signal strength indication (RSSI)). In another aspect, any sensor data may be used to determine the DoA of the segment. In some aspects, when using sensor data other than audio data captured by the microphone array to determine the DoA of the artificial sound source, the controller may determine the DoA with respect to an orientation of the microphone array 2.

The ML model 33 is a model that is used for sound liveness detection of segments of audio captured by the audio system 1. In one aspect, the ML model 33 may be a binary classifier DNN that determines whether sound originates from an artificial sound source or a live (or natural) sound source, and classifies the sound accordingly. In one aspect, the ML model may be a predefined ML model that was trained in a controlled setting (e.g., in a laboratory) to distinguish between artificial and live sounds. In some aspects, the ML model may be any type of classifier machine learning model. In one aspect, the ML model may be trained to determine whether sound originates from a particular artificial sound source. For instance, the ML model may be trained to determine whether a sound originates from a television. In some aspects, the audio system may include one or more ML models, each trained to determine whether sound originates from a particular (or different) artificial sound source (e.g., one ML model for a television, another ML model for a stand-alone loudspeaker, etc.).

The ML model receives spectral features of at least one segment of audio 31 that were extracted by the extractor 32 as input, and determines, based on the input, whether the segment of audio was produced by an artificial sound source or a live sound source as output. For instance, the spectral features may leverage the variability in audio scenes that exist in artificial sound, such as those produced by televisions. Compared to live sounds (e.g., common household sounds, such as speech, a refrigerator running, etc.) a sequence of artificial sounds can include a variety of content (e.g., speech, music, special sound effects, etc.). Thus, based on this fact, the ML model may expect that spectral diversity of an artificial sound source may be higher than live sound sources.

In addition to (or in lieu of) receiving the spectral features as input, the ML model may (optionally) receive spatial features of at least one segment of audio 31 as input, and may determine sound liveness based on the spatial features. For example, the ML model may use spatial features to discriminate between artificial sound sources and live sound sources based on spatial diversity that may exist in a sequence of audio (e.g., throughout one or several segments of audio). Since the position of some artificial sound sources may be fixed (e.g., a television mounted on a wall), spatial diversity of an artificial sound source may be expected to be low. On the other hand, a live sound source (e.g., a dog, a human) can be in motion (e.g., the dog barking while moving about the room), and therefore a segment of audio may exhibit higher spatial diversity (e.g., above a threshold), as opposed to spatial diversity of an artificial sound source. Thus, the ML model may use both spectral and spatial features as input to determine the liveness of a detected sound (e.g., whether the sound is artificial or live).

In one aspect, the output of the ML model may be a classification (e.g., a binary classifies that classifies) a segment of audio (or at least a portion of a segment of audio) that is associated with the received spectral and/or spatial features that were input to the ML model. In some aspects, the ML model output may be a score (e.g., value) indicating a likelihood that the sound source of the segment of audio is an artificial sound source.

The spatial profiler 34 receives spatial features (e.g., DoA vectors) of a segment of audio, and receives a classification of the segment of audio from the ML model 33. Upon determining that the classification from the ML model indicates that the segment of audio's source is artificial (e.g., based on a score received from the ML model being above a threshold), the spatial profiler uses the spatial features to produce (or build) a spatial profile 35 of the artificial sound source. In one aspect, the spatial profile is a statistical model (e.g., a Gaussian Mixture Model (GMM)) that is built using the received DoA vectors extracted from the segment(s) of audio. In another aspect, as an improvement to the GMM, a universal background model (UBM) may be used to establish a baseline likelihood. In one aspect, the use of a UBM may help stabilize scoring mechanism used while the audio system performs the identification process, as well as enabling better threshold setting. More about scoring and thresholds is described herein. In this case, the spatial profiler may create (or train) the spatial profile 35 by performing a Maximum A Posteriori (MAP) adaptation to the UBM. In another aspect, the spatial profile 35 produced by the profiler may be a support vector machine (SVM) classifier that is produced using the GMM. In some aspects, the vectors, instead of the GMM, may be used to train a discriminative classifier (e.g., a neural network (NN), SVM, etc.) in order to perform a binary classification. For example, when a NN is used to classify an audio segment, the output of the NN may be a confidence probability that is compared to a threshold. If, however, a SVM is used, the output may be a distance from a hyperplane that is compared to a distance threshold. In another aspect, the spatial profile may be any type of model that describes the location of a sound with respect to the (e.g., position, orientation, etc.) of the (e.g., microphone array 2 of the) audio system 1. In one aspect, the spatial profile may be stored in memory (e.g., memory of the controller 30 and/or other memory of the audio system).

As described thus far, the spatial profiler 34 may create the spatial profile 35 based on spatial features of a segment of audio that is determined by the ML model 33 to have originated from an artificial sound source. In one aspect, the profiler may create the spatial profile once a number of captured segments have been confidently classified by the ML model as having been produced by an artificial sound source. In this case, the audio system may perform the enrollment process, using the microphone array to capture microphone signals over a period of time (e.g., an hour, a day, a week, etc.). During that time, the audio system may receive several segments of audio, each of which (e.g., spectral features and spatial features associated with the segments) may be received and classified by the ML model. Spatial features of segments that are classified to originate from an artificial sound source may be received by the spatial profile, which may then be used to create the spatial profile 35. In one aspect, a spatial profile may be created once a number of segments (e.g., above a threshold) with similar spatial features (e.g., DoA vectors being similar within a tolerance value) have been classified by the ML as being produced by an artificial sound source. In some aspects, the spatial profiler may produce one or more spatial profiles, based on whether the ML model determines that segments of audio are originating from different artificial sound sources.

In one aspect, the audio system 1 may perform the enrollment process (e.g., to create one or more spatial profiles) periodically and/or without user intervention (e.g., automatically). For example, the audio system may perform at least some of the operations described herein to enroll a spatial profile periodically (e.g., once an hour, a day, a week, a month, etc.). In another aspect, the audio system may perform the enrollment process when it is determined that the audio system has moved locations. As described herein, some artificial sound sources may be fixed in one location or may be positioned in the same location for extended periods of time, such as the case where a television is mounted on a wall. As a result, the audio system may perform at least some of the enrollment operations in response to determining that the audio system has moved. To do this, the controller 30 may receive sensor input to determine whether the audio system has moved to a new location. For instance, the sensor input may be received from a motion sensor (e.g., an accelerometer, an inertial measurement unit (IMU), etc.), which may be integrated within the audio system, and from which the controller determines that the system has moved (e.g., being picked up by a user and placed in a new location). In response to determining that the electronic device has moved, the controller 30 may perform another enrollment process in which a new (or updated) spatial profile for the location of the artificial sound source is created using one or more additional segments of audio captured by the microphone array 2. In another aspect, the controller may use any type of sensor input, such as image data captured by a camera (not shown), indicating that the scene captured within the field of view of the camera has changed. As another example, the controller may use RSSI of a wireless connection between the audio system and the artificial sound source, as described herein.

Figure 3:
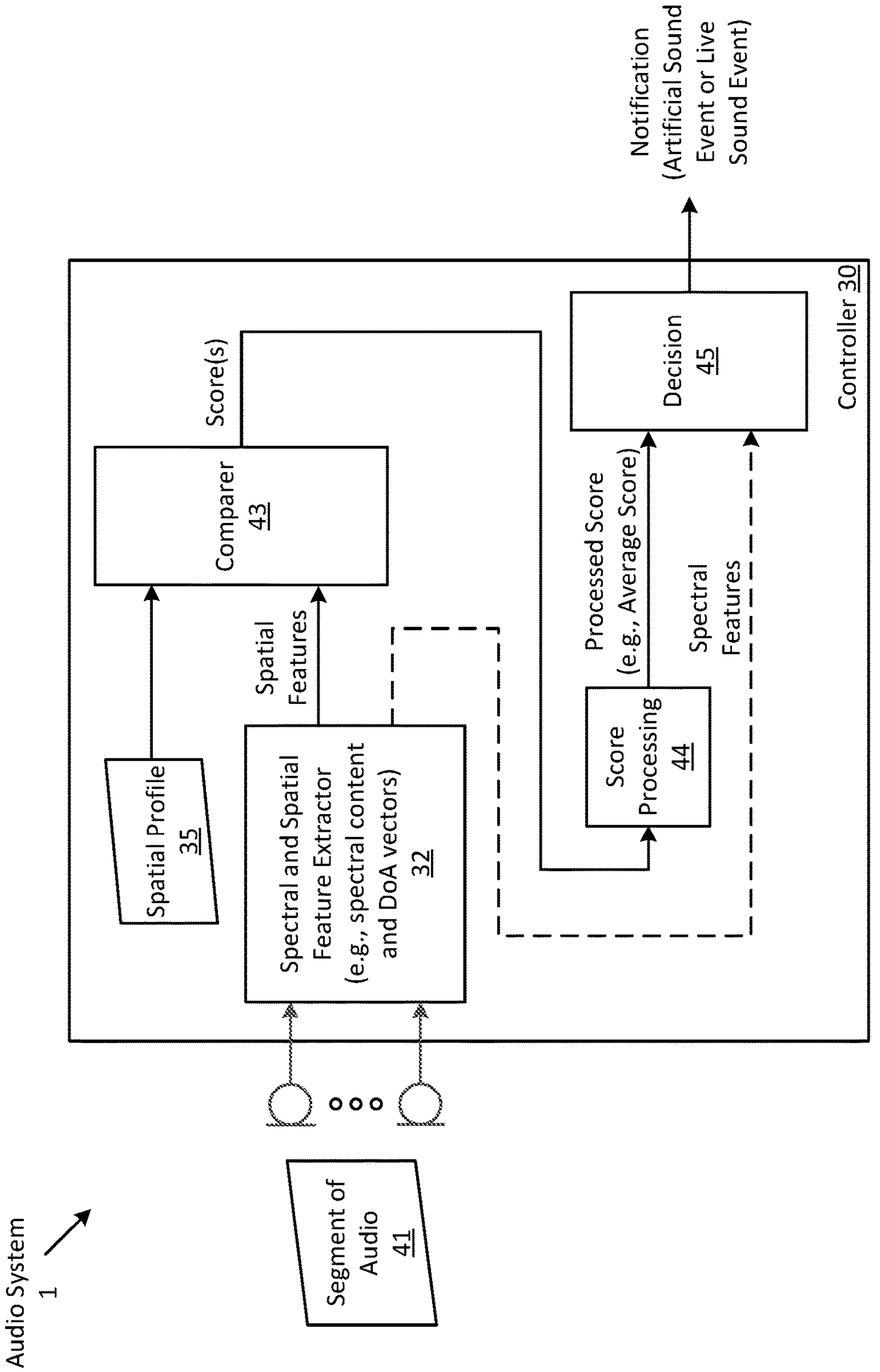
FIG. 3 shows a block diagram of the audio system that is configured to perform the identification process for determining whether a detected sound event is produced by the artificial sound source or a live sound source according to one aspect.

FIG. 3 shows a block diagram of the audio system that is configured to perform the identification process for determining whether a detected sound event is produced by an artificial sound source or a live sound source according to one aspect. The controller includes several operational blocks for performing the identification process, which include the spectral and spatial feature extractor 32, a comparer 43, a score processing 44, and a decision 45. In one aspect, the operations described in this figure for performing the identification process may be performed subsequent to the performance of the enrollment process described herein.

The spectral and spatial feature extractor 32 receives one or more microphone signals that include a sound event as a segment of audio 41. In one aspect, the segment of audio 41 may be of a short duration (e.g., one or more seconds length). The extractor may extract spatial features, such as a DoA vector for each audio frame that is included within the segment of audio 41. The comparer 43 receives the spatial features and the spatial profile 35 and compares the spatial features to the spatial profile 35 to generate a score. For instance, the comparer may determine, for each audio frame of the several audio frames making up the segment of audio, a score based on a comparison of a DoA vector associated with the audio frame and the spatial profile. In one aspect, the score may represent a likelihood that the segment of audio (or a portion of the segment associated with the DoA vector) originated from the artificial sound source of the spatial profile. Specifically, the higher the score (e.g., being above a threshold), the greater the likelihood that the segment originated from the artificial source.

In one aspect, if a UBM is used to create the spatial profile, the score generated by the comparer 43 may be a difference between 1) the score produced by comparing the DoA vector and the spatial profile, and 2) the UBM, which as described herein may be a baseline of likelihood. In which case, the determination of whether the sound event is artificial or live may be based on whether the difference is above a threshold value.

The score processing 44 is configured to process (e.g., smooth) one or more scores received from the comparer 43. As an example, the processing 44 may receive the scores determined by the comparer 43 and determine an average score, which may indicate the likelihood that the segment of the audio originated from the artificial source. For instance, the average may sum the scores and divide the number by the total number of scores received from the comparer. In one aspect, the average may average scores received for all audio frames of the segment of audio 41. In another aspect, the processor may determine a median score from the scores received from the comparer. The decision 45 receives the processed score (e.g., average score, median score, etc.) and determines whether the average score exceeds a threshold value, which indicates that the segment of audio was produced by the artificial source. Conversely, the segment may be determined to have originated from a live source when the average score is below the threshold value.

Upon determining what type of source produced the segment of audio, the decision 45 may output a notification that indicates whether the sound event of the segment of audio 41 is an artificial sound event (e.g., produced by an artificial source) or a live sound event (e.g., produced by a live source). In one aspect, the notification may be output to another electronic device that is communicatively coupled (e.g., via a wired or wireless connection). For example, the electronic device may be an alarm system of a residence, which upon determining that the segment of audio is a live sound event, may activate an alarm. In another aspect, the notification may be transmitted to an application (software program) that is being executed by the audio system.

In one aspect, the decision 45 may (optionally) receive one or more spectral features of the segment of audio from the feature extractor, and may use the spectral features to identify the audio. Specifically, the decision may perform sound recognition operations to identify the sound event captured by the audio system. Once identified, a description of the sound event may be included within the notification. For example, referring to FIG. 1, the notification 26 indicates that the sound event is window glass being broken. In one aspect, the notification may also include a location and/or direction at which the live (or artificial) sound event took place (e.g., when the sound event is a person speaking, the notification may indicate that a person in front of the audio system is speaking.

Figure 4:
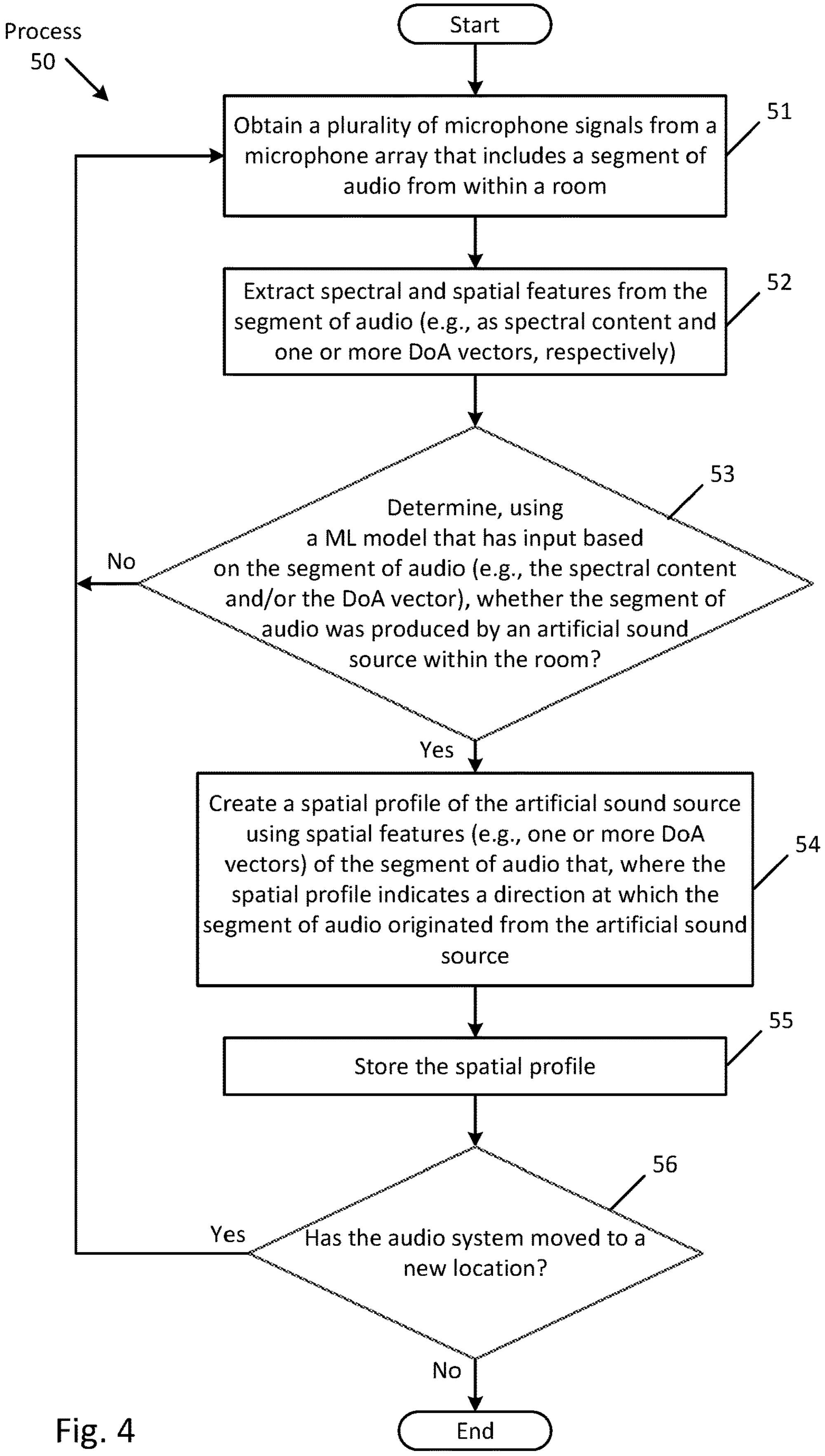
FIG. 4 is a flowchart of one aspect of the enrollment process.
Figure 5:
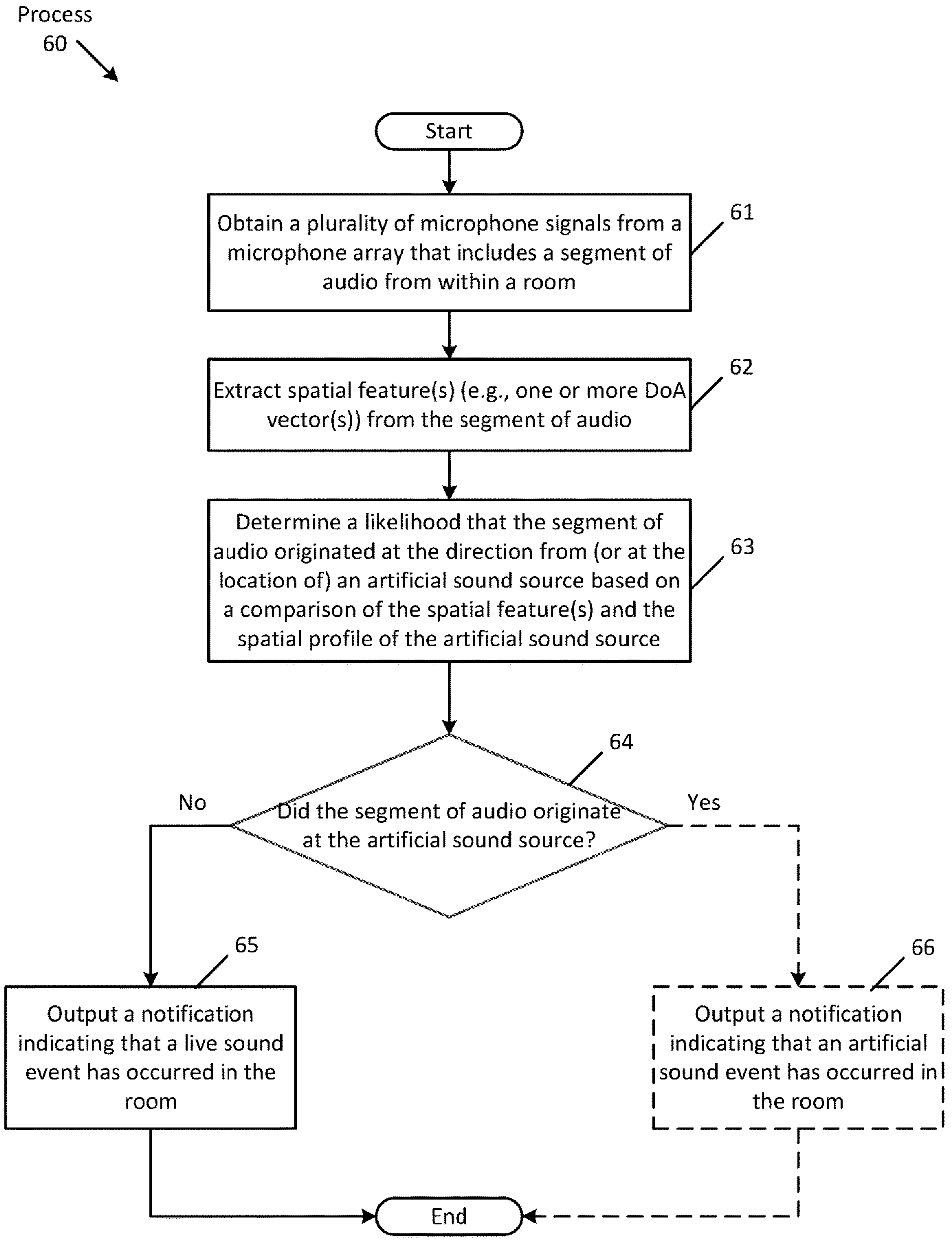
FIG. 5 is a flowchart of one aspect of the identification process.

FIGS. 4 and 5 are flowcharts of processes 50 and 60, respectively. In one aspect, the processes may be performed by the audio system 1. For instance, both processes may be performed by the controller 30 of the system. Thus, these figures will be described with reference to FIGS. 1*a*-3.

In another aspect, at least some of the operations described herein may be performed by another electronic device in communication with the system (e.g., a remote server). In which case, audio data may be transmitted to the remote server for the server to perform the enrollment and/or identification process, as described herein.

Regarding FIG. 4, this figure is a flowchart of one aspect of the process 50 to perform the enrollment process. The process 50 begins by the controller 30 obtaining several microphone signals from the microphone array 2 that includes a segment of audio from within a room in which the audio system is located (at block 51). In one aspect, the segment of audio may be a sound event that occurs within a room in which the audio system is located. The controller 30 extracts spectral and spatial features from the segment of audio (at block 52). For instance, the extractor 32 may extract (e.g., from each audio frame of the segment of audio) spectral content and a DoA vector that indicates (e.g., an estimate of) the direction from which the (e.g., audio frame of the) segment of audio originated within the room. The controller determines, using a ML model that has input based on the segment, whether the segment of audio was produced by an artificial sound source (at decision block 53). As described herein, the spectral content and DoA vector(s) of the segment of audio may be applied as input into the ML model 33, which has an output that classifies the segment having originated at an artificial source or a live source. In response to not being produced by an artificial sound source, the process returns to block 51 for the controller 30 to obtain microphone signals.

Otherwise, in response to determining that the segment of audio was produced by the artificial sound source, the controller creates a spatial profile of the artificial sound source using spatial features (e.g., DoA vector(s) of the segment of audio, where the spatial profile indicates a direction (and/or location) at which the segment of audio originated from the artificial sound source (at block 54). The controller 30 stores the spatial profile for later use during an identification process of a segment of audio (at block 55).

In one aspect, the controller 30 may perform at least some of these operations to create the spatial profile by capturing several (different) segments of audio over a period of time (e.g., an hour, a day, a week, etc.). In which case, the controller may create the spatial profile, and once an additional captured segment is determined to be produced by the artificial sound source (e.g., originating at a direction associated with a created spatial profile), the controller may update the created spatial profile (or create a new profile using spectral and/or spatial features of the newly captured (and the previously captured) segments of audio classified as artificial sound sources. In another aspect, the controller 30 may accumulate spectral and spatial features of segments for a period of time (or until enough features are accumulated), before creating the spatial profile. Thus, the controller may create the profile once a level of certainty is reached (e.g., a threshold number of segments are determined to have been originated from a particular location). In either case, the controller may extract features from several segments of audio captured by the microphone array, where features of those segments that are determined to be produced by an artificial sound source are used to create the spatial profile.

Returning to the process 50, the controller determines whether the audio system has moved to a new location (at block 56). For instance, the controller may receive motion sensor data (e.g., from an accelerometer), and from which the controller may determine whether the audio system has been moved. If so, the controller may return to block 51 to recreate a spatial profile or update the existing profile of an artificial sound source. For example, the controller may obtain several additional microphone signals from the microphone array that include a new segment of audio, may determine whether the new segment of audio was produced by the (e.g., known) artificial sound source (or another sound source), and, in response to determining that the new segment was produced by the artificial sound source, create an updated spatial profile for the source.

FIG. 5 is a flowchart of one aspect of the process 60 to perform the identification process. The process 60 begins with the controller 30 obtaining several microphone signals from the microphone array that includes a segment of audio from within the room (at block 61). In one aspect, the segment of audio may be obtained once (or subsequent) to the controller having created the (or one or more) spatial profiles, as described in process 50 of FIG. 4). The controller extracts one or more spatial features (e.g., one or more DoA vectors) from the segment of audio (at block 62). For example, the extractor 32 may extract a DoA vector for each audio frame of several audio frames that make up the obtained segment of audio. The controller determines a likelihood that the segment of audio originated at the direction from (or at the location of) an artificial sound source based on a comparison of the spatial feature(s) and a spatial profile of the artificial sound source (at block 63). In particular, the comparer 43 may determine, for each DoA vector extracted for each audio frame of the segment of audio, a score based on a comparison of the DoA vector and the spatial profile, the score processing 44 may determine an average score of the determined scores, and the decision 45 may determine whether the average score exceeds a threshold value. In one aspect, the controller may perform these operations for at least one spatial profile created during the enrollment process described in FIG. 5. In another aspect, the controller may perform these operations for all created spatial profiles. The controller 30 determines if the segment of the audio originate at the artificial sound source (at decision block 64). For instance, the controller determines whether the score (or average score) generated is greater than the threshold value. If not, the controller outputs a notification indicating that a live sound event has occurred in the room (at block 65). For instance, the controller may transmit the notification to another electronic device (e.g., user device 21 in FIG. 1), alerting the device of the live sound event. As another example, the controller may output the notification via the audio system. For instance, the notification may be output via at least one speaker and/or a display screen of the audio system. In one aspect, as described herein, the notification may include a description of the sound event, such as a textual description of the vent, the location within the room at which the sound event originated, etc. If, however, the segment of audio did originate at the artificial sound source, the controller outputs a notification indicating that an artificial sound event has occurred in the room (at block 66).

Some aspects may perform variations to the processes 50 and 60 described herein. For example, the specific operations of at least some of the processes may not be performed in the exact order shown and described. The specific operations may not be performed in one continuous series of operations and different specific operations may be performed in different aspects. For instance, the processes may not perform at least some operations, such as those in dashed boundaries. For example, the process 60 may not output the notification indicating that the artificial sound event has occurred at block 66. Instead, the process may simply end.

As described herein, one aspect of the present technology is the gathering and use of data available from specific and legitimate sources to improve a user's experience by reducing (or eliminating) false classification of artificial sound events (e.g., sounds produced by an audio playback device, such as a television) as live sound events. The present disclosure contemplates that in some instances, this gathered data may include personal information data that uniquely identifies or can be used to identify a specific person. Such personal information data can include audio data, demographic data, location-based data, online identifiers, telephone numbers, email addresses, home addresses, data or records relating to a user's health or level of fitness (e.g., vital signs measurements, medication information, exercise information, SPL measurements), date of birth, or any other personal information.

The present disclosure recognizes that the use of such personal information data, in the present technology, can be used to the benefit of users. For example, the audio data can be used to better classify sound events occurring within an environment as live or artificial, in order to better notify users of live sound events. Accordingly, use of such personal information data enables users to have perform user experience.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

As previously explained, an aspect of the disclosure may be a non-transitory machine-readable medium (such as microelectronic memory) having stored thereon instructions, which program one or more data processing components (generically referred to here as a "processor") to perform the enrollment process, the identification process, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:

capturing, using a microphone array, a sound event produced by a sound source within an environment of the microphone array as a first plurality of microphone signals;

producing, using a machine learning (ML) model, a spatial profile that identifies the sound source and a location within the environment at which the sound source is located based on the first plurality of microphone signals;

capturing, using the microphone array, a subsequent sound event within the environment as a second plurality of microphone signals;

determining whether the subsequent sound event originated from the location within the environment based on the second plurality of microphone signals and the spatial profile; and responsive to determining that the sound event originated from the location, identifying the sound source based on the second plurality of microphone signals.

2. The method of claim 1, wherein determining whether the subsequent sound event originated from the location comprises comparing spatial content of the second plurality of microphone signals and the spatial profile.

3. The method of claim 2, wherein the spatial content comprises a direction of arrival (DoA) of the sound event with respect to the microphone array, wherein determining whether the subsequent sound event originated from the location comprises determining that the DoA matches at least a portion of the spatial profile based on the comparison.

4. The method of claim 1, wherein identifying the sound source comprises:

extracting a spectral feature of the subsequent sound event from one or more microphone signals of the second plurality of microphone signals; and comparing the extracted spectral feature with a stored spectral feature associated with the sound source.

5. The method of claim 1 further comprising extracting, from at least one microphone signal of the first plurality of microphone signals, 1) at least one spatial feature of the sound event that indicates the location of the sound source of the sound event with respect to the microphone array, and 2) at least one spectral feature of the sound event, wherein the spatial profile is produced as output of the ML model based on input of the at least one spatial feature and the at least one spectral feature.

6. The method of claim 1, wherein the capturing of the sound event and the producing of the spatial profile occur during an enrollment process performed by an electronic device for the sound source, and the capturing of the subsequent sound event, determining, and identifying occur during an identification process subsequently performed by the electronic device.

7. The method of claim 1, wherein the microphone array is a part of a smart speaker.

8. An electronic device, comprising:

a microphone array;

at least one processor; and memory having instructions stored therein which when executed by the at least one processor causes the electronic device to:

capture, using the microphone array, a sound event produced by a sound source within an environment of the electronic device as a first plurality of microphone signals;

produce, using a machine learning (ML) model, a spatial profile that identifies the sound source and a location within the environment at which the sound source is located based on the first plurality of microphone signals;

capture, using the microphone array, a subsequent sound event within the environment as a second plurality of microphone signals;

determine whether the subsequent sound event originated from the location within the environment based on the second plurality of microphone signals and the spatial profile; and responsive to determining that the sound event originated from the location, identify the sound source based on the second plurality of microphone signals.

9. The electronic device of claim 8, wherein the instructions to determine whether the subsequent sound event originated from the location comprises instructions to compare spatial content of the second plurality of microphone signals and the spatial profile.

10. The electronic device of claim 9, wherein the spatial content comprises a direction of arrival (DoA) of the sound event with respect to the microphone array, wherein the instructions to determine whether the subsequent sound event originated from the location comprises instructions to determine that the DoA matches at least a portion of the spatial profile based on the comparison.

11. The electronic device of claim 8, wherein the instructions to identify the sound source comprises instructions to:

extract a spectral feature of the subsequent sound event from one or more microphone signals of the second plurality of microphone signals; and compare the extracted spectral feature with a stored spectral feature associated with the sound source.

12. The electronic device of claim 8, wherein the memory has further instructions to extract, from at least one microphone signal of the first plurality of microphone signals, 1) one or more spatial features of the sound event that indicates the location of the sound source of the sound event with respect to the microphone array, and 2) one or more spectral features of the sound event, wherein the spatial profile is produced as output of the ML model based on input of the one or more spatial features and the one or more spectral features.

13. The electronic device of claim 8, wherein the capturing of the sound event and the producing of the spatial profile occur during an enrollment process performed by the electronic device for the sound source, and the capturing of the subsequent sound event, determining, and identifying occur during a subsequent identification process for the sound source.

14. The electronic device of claim 8 is a smart speaker.

15. Processing circuitry of an electronic device that is configured to:

capture, using a microphone array, a sound event produced by a sound source within an environment of the electronic device as a first plurality of microphone signals;

produce, using a machine learning (ML) model, a spatial profile that identifies the sound source and a location within the environment at which the sound source is located based on the first plurality of microphone signals;

capture, using the microphone array, a subsequent sound event within the environment as a second plurality of microphone signals;

determine whether the subsequent sound event originated from the location within the environment based on the second plurality of microphone signals and the spatial profile; and responsive to determining that the sound event originated from the location, identify the sound source based on the second plurality of microphone signals.

16. The processing circuitry of claim 15, wherein the processing circuitry determines whether the subsequent sound event originated from the location by comparing spatial content of the second plurality of microphone signals and the spatial profile.

17. The processing circuitry of claim 16, wherein the spatial content comprises a direction of arrival (DoA) of the sound event with respect to the microphone array, wherein the processing circuitry determines whether the subsequent sound event originated from the location by determining that the DoA matches at least a portion of the spatial profile based on the comparison.

18. The processing circuitry of claim 15, wherein the processing circuitry identifies the sound source by:

extracting a spectral feature of the subsequent sound event from one or more microphone signals of the second plurality of microphone signals; and comparing the extracted spectral feature with a stored spectral feature associated with the sound source.

19. The processing circuitry of claim 15, wherein the processing circuitry captures the sound event and produces the spatial profile during an enrollment process for the sound source, and the processing circuitry captures of the subsequent sound event, determines, and identifies during a subsequent identification process for the sound source.

20. The processing circuitry of claim 15, wherein the electronic device is a smart speaker.

* * * * *